UNITED STATES PATENT OFFICE.

ARTHUR ZART, OF VOHWINKEL, NEAR ELBERFELD, AND HUGO SCHWEITZER, OF ELBERFELD, GERMANY, ASSIGNORS TO FARBENFABRIKEN VORM. FRIEDR. BAYER & CO., OF ELBERFELD, GERMANY, A CORPORATION OF GERMANY.

YELLOW DISAZO DYE.

999,944.      Specification of Letters Patent.      Patented Aug. 8, 1911.

No Drawing.      Application filed April 25, 1911. Serial No. 623,177.

*To all whom it may concern:*

Be it known that we, ARTHUR ZART and HUGO SCHWEITZER, doctors of philosophy, chemists, citizens of the German Empire, residing, respectively, at Vohwinkel, near Elberfeld, and Elberfeld, Germany, have invented new and useful Improvements in Yellow Disazo Dye, of which the following is a specification.

The present invention relates to the manufacture and production of new azo dyestuffs capable of dyeing unmordanted cotton in from yellow to orange shades which on being developed on the fiber become fast to washing.

The process for their production consists in converting into urea compounds sulfonic acids of nitroaminoazo compounds in which the nitro- and amino groups are contained in different nuclei or of the corresponding diaminoazo compounds in which one hydrogen of one amino group is replaced by an acid radical and in subsequently reducing the products obtained from the nitroaminoazo compounds or in saponifying the products obtained from diaminoazo compounds containing an acid radical. The urea compounds are produced in the usual way by treatment with phosgene. The new dyes are after being dried and pulverized in the shape of their alkaline salts dark yellow powders soluble in water with a yellow color and soluble in concentrated sulfuric acid with a reddish to violet color. Upon reduction with stannous chlorid and hydrochloric acid a diamin sulfonic acid and a urea of a diamin is obtained, which is split up into carbonic acid and a diamin.

In order to illustrate the new process more fully the following example is given, the parts being by weight:—The dye obtained from 216 parts of diazotized monoformyl-meta-phenylenediamin sulfonic acid and 187.5 parts of cresidin

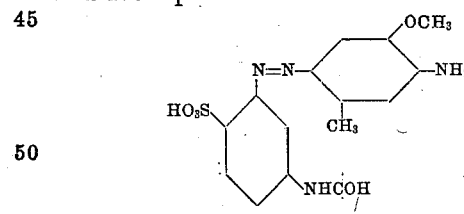

is after solution in aqueous sodium carbonate converted into the urea compound by treatment with phosgene, then salted out, filtered off and boiled for 20 minutes with a 1 per cent caustic soda lye to eliminate the formic acid radical. It is then salted out and filtered off. It is after being dried and pulverized in the shape of its sodium salt a dark yellow powder soluble in water with a yellow color and soluble in concentrated sulfuric acid with a violet color; yielding upon reduction with stannous chlorid and hydrochloric acid meta-phenylene-diamin-ortho-sulfonic acid and the urea of aminocresidin:

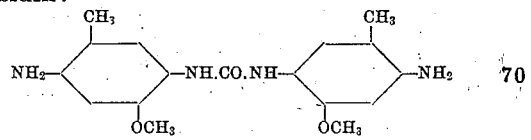

which is further decomposed into para-methoxy - ortho - meta - diaminotoluene and carbonic acid. It dyes cotton yellow yielding a pure yellow of good fastness to washing after combination with diazotized para-nitranilin. The shade thus produced can be well discharged.

Instead of formyl-meta-phenylenediamin sulfonic acid 6-nitro-2-aminotoluene-4-sulfonic acid, 4-nitranilin-2-sulfonic acid, 4-nitranilin-3-sulfonic acid, formyl-2.6-diaminotoluene-4-sulfonic acid, formyl-2.4-toluylenediamin - 5 - sulfonic acid, formyl - para-phenylenediamin sulfonic acid:

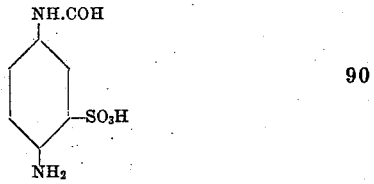

etc. can be employed.

As second component any other suitable amin can be used e. g. anilin, toluidins, xylidins, acidyldiamins, naphthylamins, etc.

We claim:—

1. The herein described new dyestuffs being ureas of sulfonic acids of aminoazo compounds containing free amino groups, which dyes are after being dried and pulverized in the shape of their alkaline salts dark yellow powders soluble in water with a yellow and soluble in concentrated sulfuric acid with a reddish to violet color; yielding upon reduction with stannous chlorid and hydrochloric acid a diamino sulfonic acid and a urea of a diamin, which is further decomposed into carbonic acid and a diamin; dyeing cotton yellow to orange shades which on being developed on the fiber become fast to washing, substantially as described.

2. The herein described new dyestuff being the urea of the azo compound from meta-phenylenediamin sulfonic acid and cresidin of the formula:

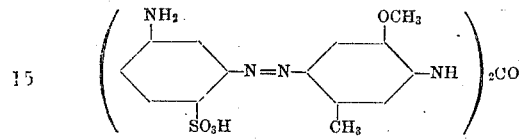

which is after being dried and pulverized in the shape of its sodium salt a dark yellow powder soluble in water with a yellow color and soluble in concentrated sulfuric acid with a violet color; yielding upon reduction with stannous chlorid and hydrochloric acid meta-phenylenediamin sulfonic acid and the urea of amino-cresidin which is further decomposed into para-methoxy-ortho-meta-diamino-toluene and carbonic acid; dyeing cotton yellow shades fast to washing after combination with diazotized para-nitranilin, substantially as described.

In testimony whereof we have hereunto set our hands in the presence of two subscribing witnesses.

ARTHUR ZART. [L. S.]
HUGO SCHWEITZER. [L. S.]

Witnesses:
CHAS. J. WRIGHT,
ALFRED HENKEL.